No. 628,240. Patented July 4, 1899.
T. DUNCAN.
ELECTRIC METER.
(Application filed July 9, 1898. Renewed Apr. 5, 1899.)
(No Model.) 2 Sheets—Sheet 2.

Witnesses:
Samuel R. Bachtel
Emma R. Jones.

Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 628,240, dated July 4, 1899.

Application filed July 9, 1898. Renewed April 5, 1899. Serial No. 711,797. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in alternating-current induction motor-meters, and particularly to that type of meters adapted for measuring the energy consumed by inductive translating devices, such as arc-lamps, motors, theater or stage dimmers, and the like.

The increasing use and application of the alternating-current motor for the distribution of power has created an imperative demand for an integrating energy-meter that will measure with accuracy the lagging currents used by these motors, and for a meter in which the energy consumed is very small. It is now well understood in the art that in order to accurately measure the energy in inductive circuits the magnetic field which represents the electromotive force in volts must be in quadrature therewith or ninety degrees therefrom.

To obtain this magnetic quadrature is the principal object of my present invention. The method of securing this result most commonly employed at present is that in which a derived shunt-current is lagged by an impedance-coil and supplied to a shunt field-coil, then employing a closed secondary in coöperative relation with the shunt field-coil, and then combining the magnetizing effect of each into a resultant magnetic field that is ninety degrees behind the pressure. In my present invention I employ one shunt-coil only and supply it direct with a current that is itself in quadrature with the electromotive force, thereby eliminating from the said shunt or volt field-coil all auxiliary windings as heretofore employed.

Figure 1:
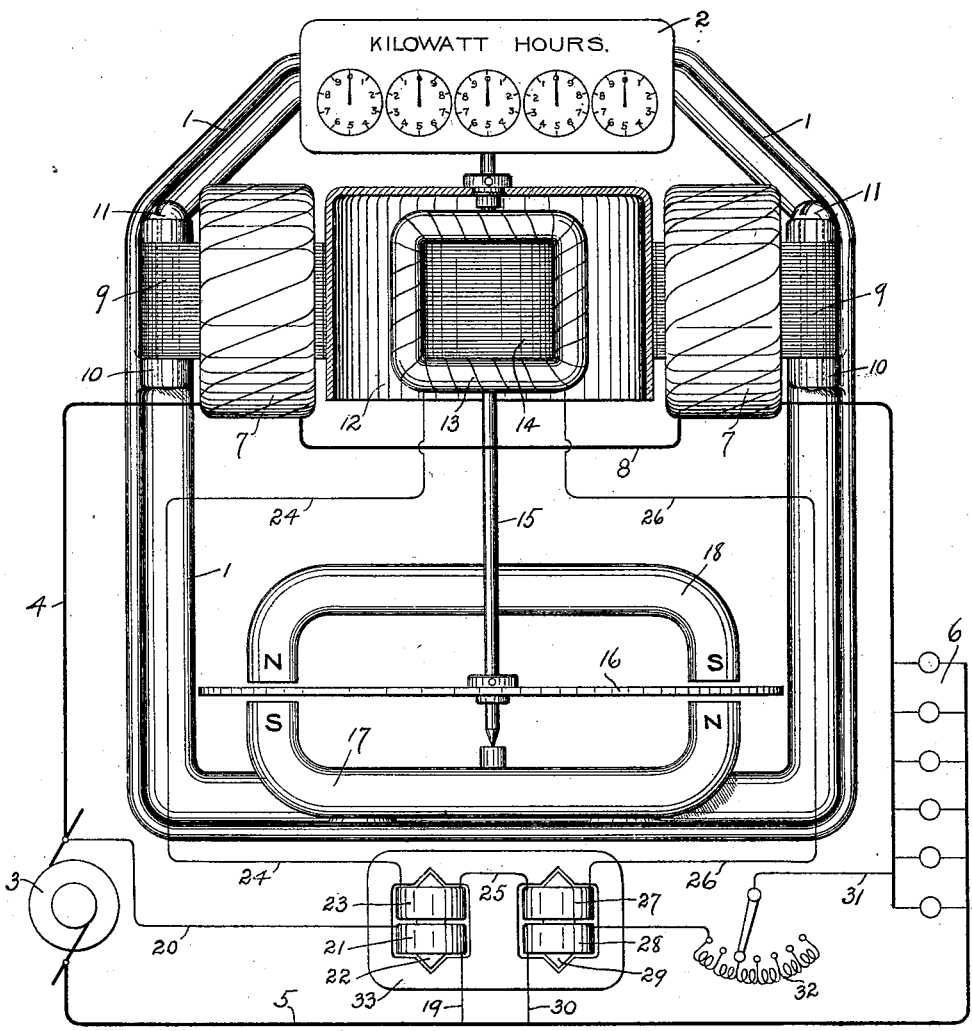
Figure 2:
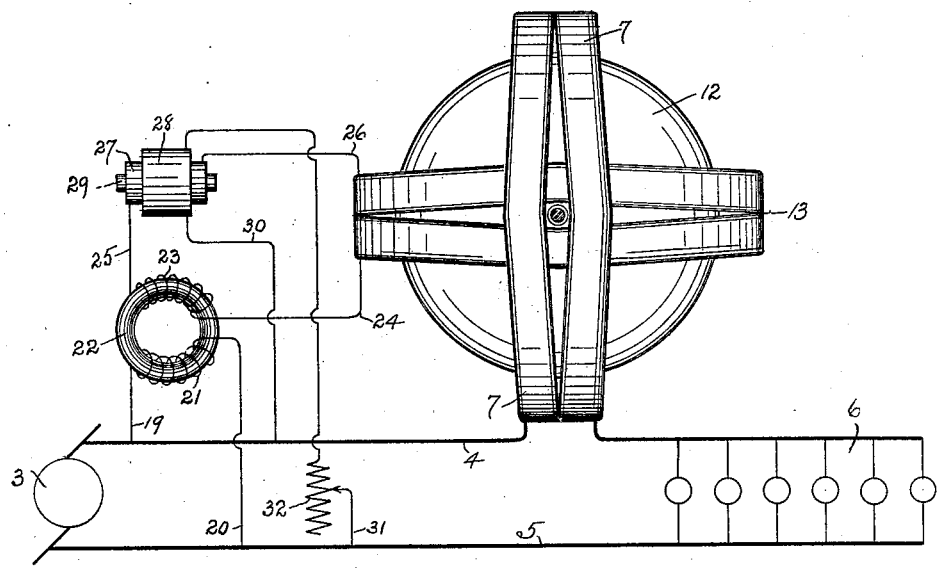
Figure 3:
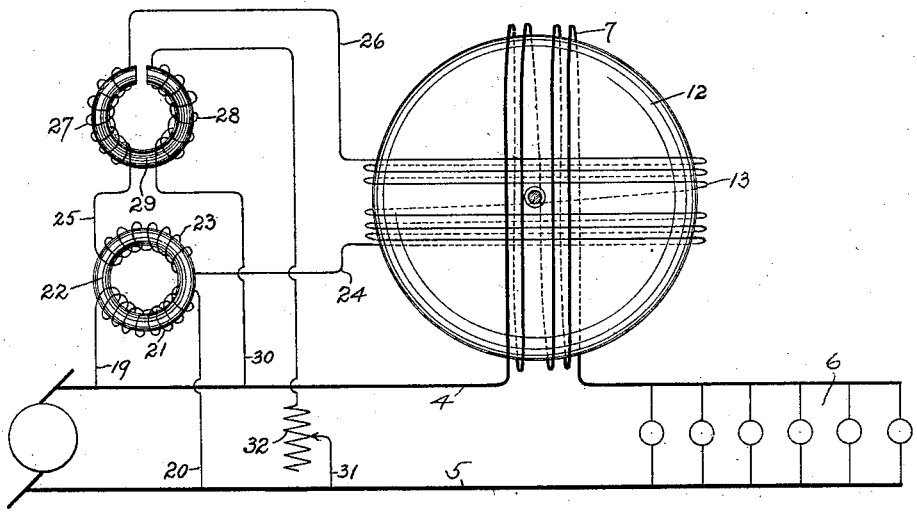

In the accompanying drawings, in which similar reference-numerals designate like parts throughout the several views, Figure 1 is a front elevation showing the operative parts of my invention mounted and supported upon an upright metal frame. Fig. 2 shows a modified arrangement of the cylindrical armature embraced by the energizing-coils, and also showing the double-transformer arrangement represented by two separate transformers. Fig. 3 is a diagrammatic view of my invention, showing the relative windings as employed in a meter of similar construction to that shown in Fig. 2.

In the following description of my invention reference will be chiefly made to Fig. 1. Upon the upright metallic supporting-frame 1 the operative parts of my improvement are properly mounted. To the vertical sides of this frame are cast or otherwise fixed the brackets 10, upon which is supported the laminated iron core 9, by means of the screws 11 in said brackets. Upon this laminated core, and near the opposite ends thereof, are mounted the two series field-coils 7, which are connected into the main lead 4, thereby putting them in series with the translating devices 6, the remaining lead 5, and the generator 3. A connecting-wire 8 puts the coils in series with each other. The field-coils, which are in series with the translating devices, magnetize the iron core 9 with a strength proportional to the current in amperes passing through the circuit. Midway the poles of the iron core 9 is secured in any suitable manner the volt-coil 13, which is mounted and wound upon a laminated iron core 14. The current traversing this coil 13 is proportional to the electromotive force of the leads 4 and 5, but is caused to lag ninety degrees behind the said electromotive force by means of the phase-changing device hereinafter described. The terminals of this volt field-coil 13 are connected by means of the wires 24, 25, and 26 to the two coils 23 and 27 of the phasing transformer.

Rigidly supported upon the upright armature-spindle 15, provided with proper bearings at its extremities, is an aluminium cup-shaped revoluble armature 12, which is adapted to be actuated by the combined action of the series coils and the shunt or volt coil in a well-understood manner. At or near the lower extremity of said spindle is also secured an aluminium disk 16, that rotates between the poles of the permanent magnets 17 and 18, thereby causing the speed of the meter to be proportional to the watts. The revolutions of the armature-spindle are adapted to actuate the registering-train 2 in the usual or other proper manner.

To obtain a current through the volt-coil 13, that is in quadrature with the electromotive force, I employ the coil 21, having its terminals 19 and 20 connected in parallel to the supply-mains 4 and 5. The magnetic field set up by this coil 21 magnetizes the iron core 22 and induces a secondary current in the coil 23, which is connected in series with a lagging coil 27, that is wound upon an iron core 29 for the purpose of retarding the phase of the current in said secondary coil 23, the said lagged current being supplied to the volt-coil 13, as shown by the shunt-wires 24 and 26. This current, on account of the resistance of the circuit through which it flows, does not quite reach quadrature; but by using the coil 28 in coöperative relation with the coil 27 a current through the volt-coil 13 is obtained that is exactly in quadrature with the electromotive force of the said supply-mains 4 and 5.

The coil 28 includes a variable resistance 32 in series with it, and has its terminals 30 and 31 connected to the mains 4 and 5, as shown. By adjusting the resistance 32 the current through the coils 13, 23, and 27 may be given a lag greater than ninety degrees, if desired, and by reversing the direction of the current through the said coil 28 I have also been able to eliminate the self-induction of the coil 27. The same result may be accomplished by reversing the current through the primary coil 21, thereby showing that by my invention I am enabled to obtain any phase angle between an electromotive force and its current from zero to a limit somewhat less than one hundred and eighty degrees.

The iron cores 22 and 29 and their respective pairs of coils are made to fit into suitable openings in the iron envelop 33, which is used to complete the magnetic circuit of the said cores 22 and 29.

What I desire to secure by Letters Patent is—

1. In an induction motor-meter, the combination of a series field; a shunt or volt coil; a revoluble closed-circuit armature; a primary coil 21; a secondary coil 23 supplying current to the said shunt-coil; an impedance-coil 27 in series with the said secondary and volt coils; and a phase-changing coil 28 in inductive relation with the said impedance-coil.

2. In an induction motor-meter the combination of a series field; a shunt or volt field-coil; an iron core in coöperative relation with said volt-coil; a revoluble aluminium armature arranged as described; an impedance-coil; a secondary circuit including the said volt and impedance coils; a primary coil inducing currents in the said secondary circuit; a phase-changing coil in coöperative relation with the said impedance-coil; and a proper registering mechanism.

3. In an induction motor-meter the combination of the series field-coils; a shunt or volt coil; a transformer having a primary circuit or coil connected to the supply-mains and a secondary coil supplying current to the said volt-coil; an impedance-coil in series with the said secondary and volt coils; a phase-changing coil connected to the supply-mains and in inductive relation to said impedance-coil; a variable resistance in series with said phase-changing coil; a revoluble armature; a retarding device; and a regulating mechanism.

4. In an induction motor-meter the combination of the series coils; a shunt-coil; a revoluble armature in inductive relation to the said energizing-coils; a double transformer comprising an iron envelop 33 with two openings, one of said openings containing an iron core 22 upon which is mounted a primary coil 21 and a secondary coil 23, the other opening containing an iron core 29 upon which is mounted or wound an impedance-coil 27 and a phase-changing coil 28, the said primary and phase-changing coils being connected to the supply-mains, and the secondary and impedance coils being in series with the volt-coil; a retarding device; and a registering mechanism.

Signed by me, at Fort Wayne, Allen county, State of Indiana, this 6th day of July, A. D. 1898.

THOMAS DUNCAN.

Witnesses:
CHARLES C. MILLER,
JOHN J. BAUER.